No. 716,196. Patented Dec. 16, 1902.
J. M. CRAIG & W. H. BUCK.
COMBINED AIR BRAKE AND SLACK ADJUSTING MECHANISM.
(Application filed Feb. 27, 1902.)
(No Model.) 2 Sheets—Sheet 1.
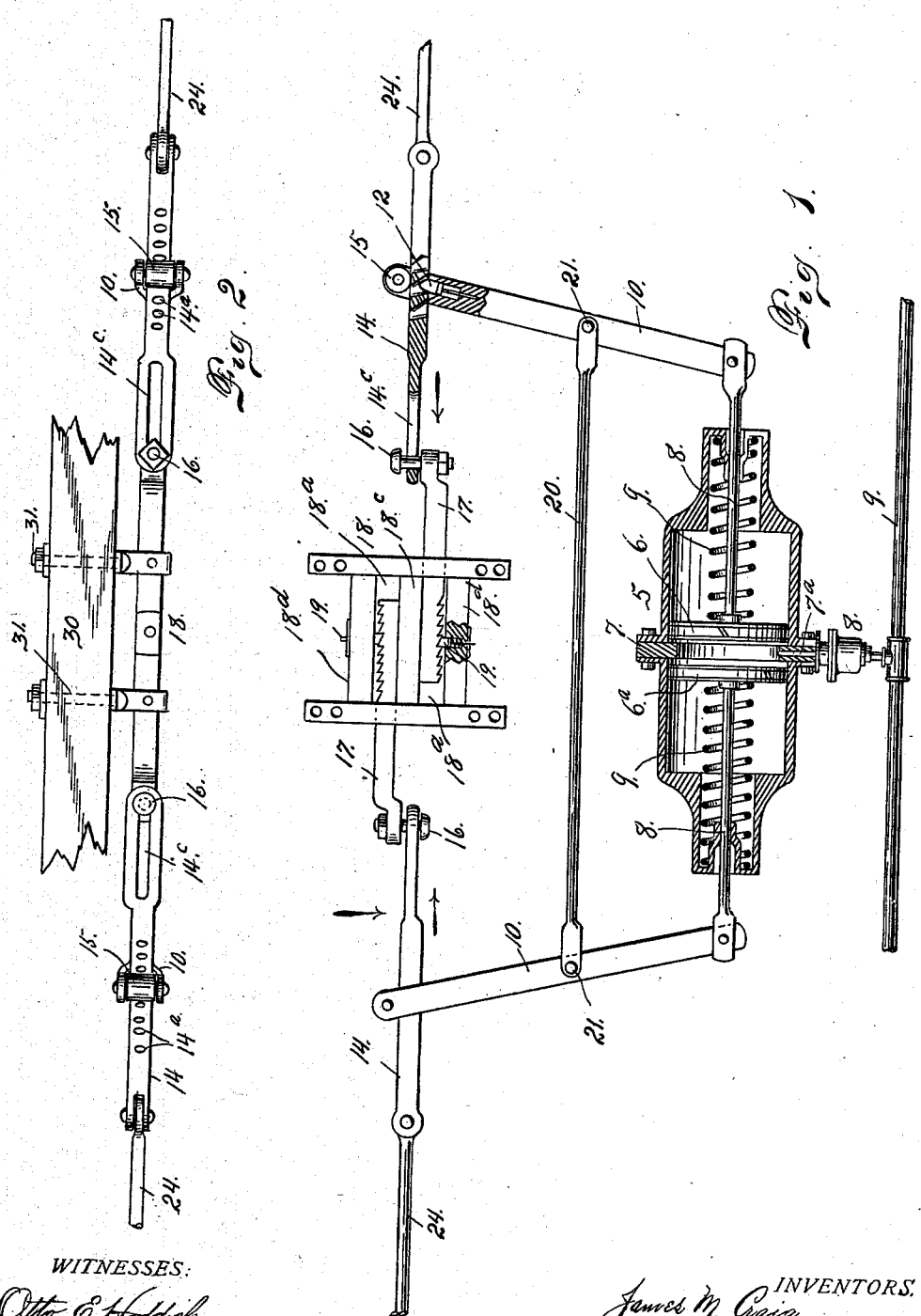
WITNESSES:
Otto E. Haddock.
Dena Nelson.
INVENTORS.
James M. Craig.
William H. Buck.
BY
ATTORNEY.

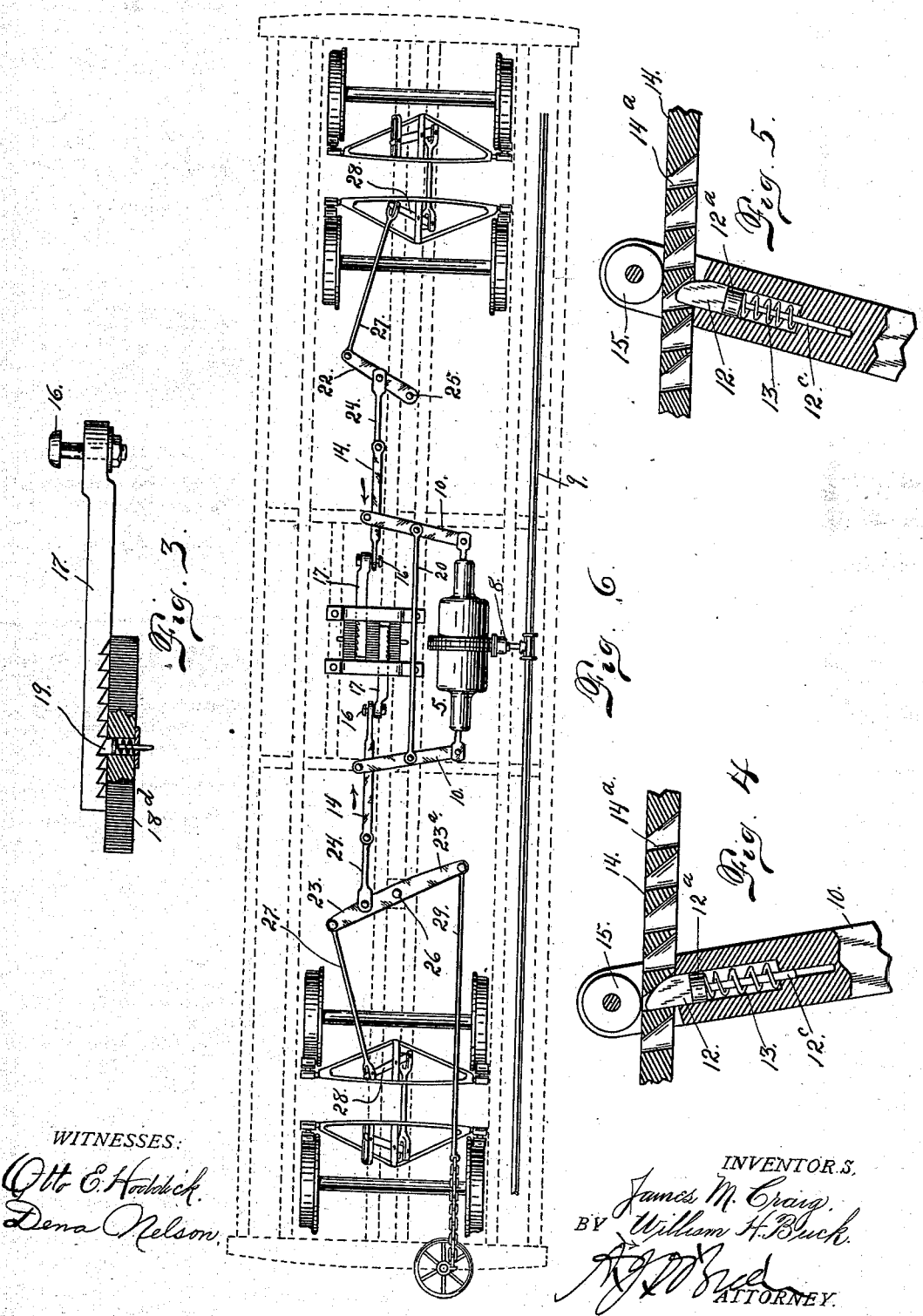

UNITED STATES PATENT OFFICE.

JAMES M. CRAIG AND WILLIAM H. BUCK, OF DENVER, COLORADO.

COMBINED AIR-BRAKE AND SLACK-ADJUSTING MECHANISM.

SPECIFICATION forming part of Letters Patent No. 716,196, dated December 16, 1902.

Application filed February 27, 1902. Serial No. 95,932. (No model.)

*To all whom it may concern:*

Be it known that we, JAMES M. CRAIG and WILLIAM H. BUCK, citizens of the United States of America, residing at Denver, in the county of Arapahoe and State of Colorado, have invented certain new and useful Improvements in a Combined Air-Brake and Slack-Adjusting Mechanism; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in combined air-brake and slack-adjusting mechanism, our object being to obtain a direct and independent application of the brakes to the wheels of both trucks of the car, whereby the brakes are applied simultaneously to both sets of wheels and flat wheels avoided. Under the systems heretofore in vogue employing a single piston in the brake-cylinder the brakes are not applied to the wheels of both trucks at the same time. Hence the wheels to which the brakes are first applied will be locked, while the car continues to move until the brakes are applied to the other wheels, thus resulting in flat wheels on the truck to which the brakes are first applied. We employ two pistons in the brake-cylinder, each piston acting through its stem on a cylinder-lever to apply the brakes to the wheels of each truck, making the brake application absolutely direct, positive, and simultaneous on both sets of wheels.

Our further object is to economize air by using a smaller brake-cylinder, obtain a quicker application of the brakes by reason of shorter piston travel, and take up all slack, thus making the piston travel uniform on all cars of the same train.

Having briefly outlined our improved construction, as well as the objects sought to be obtained thereby, we will proceed to describe the same in detail, reference being made to the accompanying drawings, in which is illustrated an embodiment thereof.

In the drawings, Figure 1 is a plan view, partly in section, illustrating our improved apparatus. Fig. 2 is a side elevation of a portion of Fig. 1, viewed in the direction of the arrow, adjacent the last-named figure. Fig. 3 is a detail view, partly in section and on a larger scale, illustrating a part of the slack-adjusting mechanism. Figs. 4 and 5 illustrate a cylinder-lever, partly in section and on a larger scale, in connection with its coöperating ratchet-bar. These views show said lever in two positions. Fig. 6 is a top or plan view of a set of brake mechanism, showing our improvements, the parts being shown on a smaller scale than in the other views.

The same reference characters indicate the same parts in all the views.

Let the numeral 5 designate the brake-cylinder, in which is located two pistons 6 and $6^a$, separated by an interiorly-projecting ring. The cylinder, as shown in the drawings, is formed in two parts, and a ring 7 is inserted between them. Each cylinder part is provided with an exteriorly-projecting flange, and the parts are fastened together by passing bolts through registering apertures formed in the ring and the two flanges. It must be understood, however, that we do not limit ourselves to this construction of cylinder, as any other suitable construction adapted to answer the purpose may be employed. The interior portion of the ring 7 forms a stop for both pistons, limiting their inward travel. This ring is bored on one side, as shown at $7^a$, to form an inlet port or passage to the cylinder-chamber from the triple valve 8, connected with the brake-pipe 9. Any suitable construction of triple valve may be employed. The auxiliary reservoir forming part of the ordinary brake-mechanism equipment is not shown in the drawings, since this feature forms no part of our invention. In the complete equipment, however, the auxiliary reservoir will be connected with the triple valve in the ordinary or any convenient or suitable manner.

The piston-stems 8 are surrounded by coil-springs 9, located between the pistons and the cylinder-heads. The function of these springs is to return the parts to their normal position after the brakes are released. The piston-stems pass through suitable stuffing-boxes, with which the cylinder-heads are provided at their outer extremities. The outer or exposed extremities of these stems are respectively connected with the adjacent extremities of two levers 10, which we will term "cylinder-levers," since they are adjacent the cylinder and operated from the pistons of the latter. The extremities of these levers remote from their connections with the piston-stems are recessed to receive dogs 12. Each dog has a piston portion $12^a$ and a stem $12^c$. This stem is surrounded by a coil-spring 13, acting to force the dog outwardly to engagement with the teeth $14^a$ of a bar 14, which passes between the outer extremity of the dog and an antifrictional roller 15, mounted on the adjacent extremity of the lever. There are two ratchet-bars 14, one for each of the levers 10. The inner extremity of each of these bars is slotted, as shown at $14^c$, to receive a connecting pin or bolt 16, mounted on one extremity of a bar 17, slidably mounted in a frame 18, secured to the bottom of the car in any suitable manner. Each bar 17 is provided with ratchet-teeth and slides in a way $18^a$. Between these ways is located a central bar $18^c$, which bounds them on one side, while on the opposite side of each is located a bar $18^d$, carrying a spring-actuated dog 19, engaging the ratchet-teeth of the adjacent bar 17. The two cylinder-levers are connected by a rod 20, whose extremities are pivoted to the levers, as shown at 21. These pins or bolts form the lever-fulcrum.

The extremities of the bars 14 are respectively connected with levers 22 and 23 by links 24. These levers are fulcrumed on the car, as shown at 25 and 26. A corresponding extremity of each lever is connected, by means of a rod 27, with the live truck-lever 28 of the ordinary brake devices. The only difference between these levers 22 and 23 is that the lever 23 is extended to form an arm $23^a$, connected with the hand brake-rod 29. The lever 22 may be likewise extended for the same purpose, if desired.

When our improved apparatus is in use, the air is admitted to the chamber of the cylinder 5 between the two pistons 6 and $6^a$, and as both pistons are free to move they are thrust outwardly in opposite directions and apply the brakes through the instrumentality of the mechanism and by virtue of the connections heretofore described. During this brake application the ratchet-bars 14 are moved inwardly or in the direction indicated by the arrows lying parallel with the bars in Figs. 1 and 6. The length of the slots $14^c$ of the levers 14 indicate the normal and proper degree of slack allowed the brake-shoes when the brakes are released. If there is any superfluous slack in the brake-rigging, the bars 14 will continue the movement after the bolts 16 reach the extremities of the slots $14^a$ nearer the levers, and when this occurs the bars 17 will be actuated to take up the slack. During this operation these bars 17 are thrust in opposite directions parallel with each other and are held by the coöperating dogs 19 in the positions to which they are respectively thrust by the brake-applying devices. When the brakes are released, the bars 14 will be moved in the opposite direction, and when the extremities of the slots $14^c$ farther from the levers engage the bolts 16 if the inward travel of the cylinder-piston is not complete the dogs 12 will allow the lever extremities to move on the ratchet-bar the required distance, since the dogs will slip over one or more teeth, as may be necessary. This operation is evident from the construction heretofore described. Suitable means are shown in Fig. 2 for connecting the frame 18 with the part 30 of the car by means of bolts 31.

Having thus described our invention, what we claim is—

1. The combination with brake devices, of a cylinder, two pistons therein, means for introducing air to the cylinder between the pistons, stems connected with the pistons and protruding from the opposite extremities of the cylinder, levers connected with the protruding piston-stems and suitably fulcrumed, a stationary frame suitably mounted, ratchet-bars slidable in the frame, dogs mounted in the frame and engaging said bars, and a suitable connection between the ratchet-bars and the piston-stem levers, and between the said levers and the brake-levers of the car-trucks, for taking up slack in the brake-rigging, substantially as described.

2. The combination with brake devices, of a cylinder, two pistons therein, means for introducing air to the cylinder between the pistons, stems connected with the pistons and protruding from the opposite extremities of the cylinder, levers connected with the protruding piston-stems and suitably fulcrumed, said levers being provided with spring-held dogs, ratchet-bars passing through the upper extremities of the levers adjacent the dogs, and slack-adjusting mechanism connected with each ratchet-bar and the brake-levers of the car-trucks, substantially as described.

3. The combination of a brake-cylinder, two pistons located therein and normally arranged to permit the introduction of the operating fluid between them, stems connected with the piston and protruding from the cylinder, levers connected with the protruding piston-stems and suitably fulcrumed, spring-held dogs carried by the levers, ratchet-bars connected in operative relation with the levers and engaged by the dogs, the said bars being slotted to provide for normal slack of the brake-shoes, slack-adjusting ratchet-bars, and pins connecting the slack-adjusting bars with the slotted bars, said pins passing through the slots of the last-named bars, substantially as described.

4. The combination with brake devices, of a cylinder, two pistons therein, means for introducing air to the cylinder between the pistons, stems connected with the pistons and protruding from the opposite extremities of the cylinder, levers connected with the protruding piston-stems and suitably fulcrumed and provided with spring-held dogs and antifrictional rollers, a ratchet-bar passing between the dog and the roller of each lever, a stationary frame suitably mounted, ratchet-bars slidable in the frame, dogs mounted in the frame and engaging said bars, a slotted connection between the last-named ratchet-bars and the ratchet-bars connected with the levers, and a suitable connection between said last-named ratchet-bars and the brake-levers of the car-trucks, substantially as described.

5. The combination with the truck-brake levers, of a cylinder having a centrally-located circumferential interiorly-projecting ring, two pistons located in the cylinder-chamber on opposite sides of the ring, means for introducing air to the cylinder between the two pistons, stems connected with the pistons and protruding from the cylinder, levers having one extremity of each connected with the piston-stems, the opposite extremity of each lever being provided with a dog and a roller suitably separated, a rod connecting the two levers intermediate their extremities, a ratchet-bar passing between the dog and roller of each lever, a connection between one extremity of each of said bars and a brake-lever of a truck, the opposite extremity of said bar being slotted, a suitable frame made fast to the car, two ratchet-bars slidable on the frame, dogs engaging the respective ratchet-bars, and a pin connecting the last-named ratchet-bars with the slotted bar, substantially as described.

In testimony whereof we affix our signatures in presence of two witnesses.

JAMES M. CRAIG.
WILLIAM H. BUCK.

Witnesses:
DENA NELSON,
A. J. O'BRIEN.